Sept. 8, 1942. R. J. WEIKERT 2,295,066
PROCESS FOR FORMING RUBBER HYDROCHLORIDE
Filed May 22, 1939 3 Sheets-Sheet 1
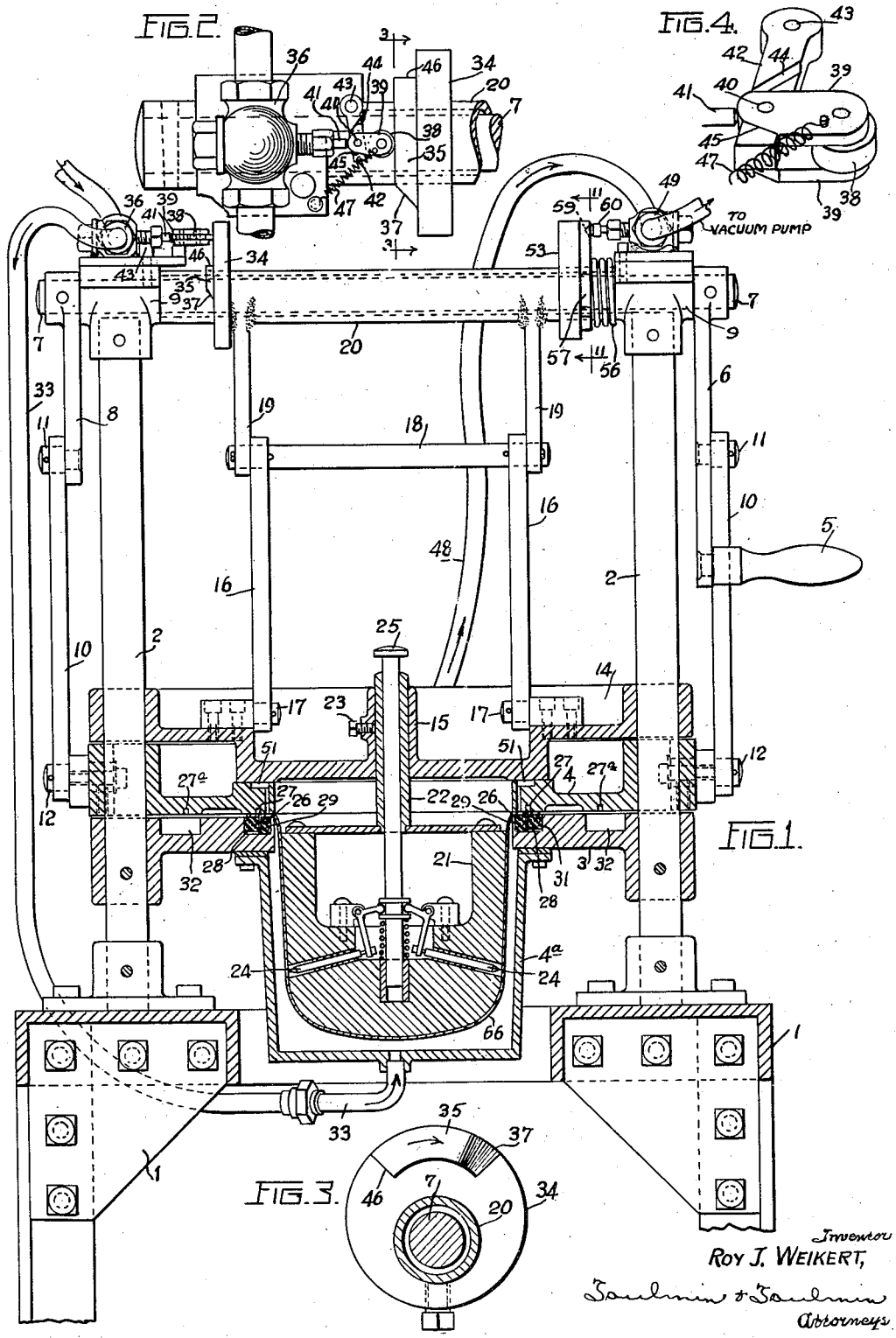
Inventor
ROY J. WEIKERT,
Toulmin & Toulmin
Attorneys Sept. 8, 1942.     R. J. WEIKERT     2,295,066
PROCESS FOR FORMING RUBBER HYDROCHLORIDE
Filed May 22, 1939     3 Sheets-Sheet 2
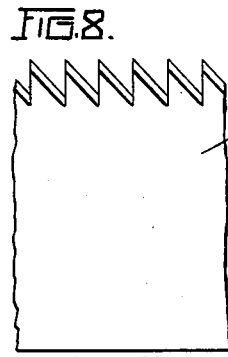
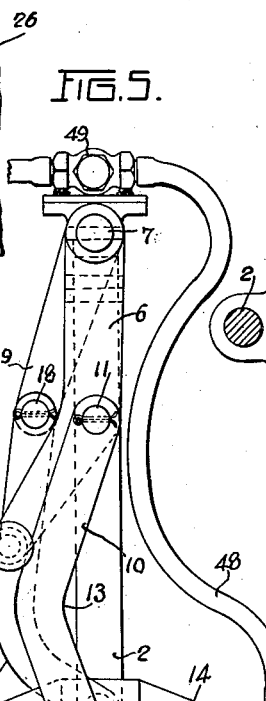
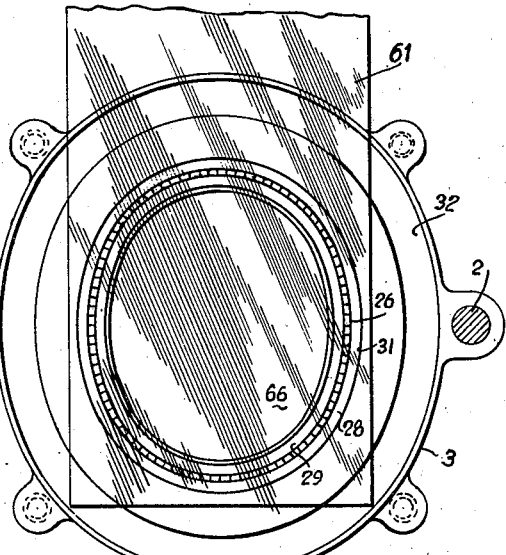
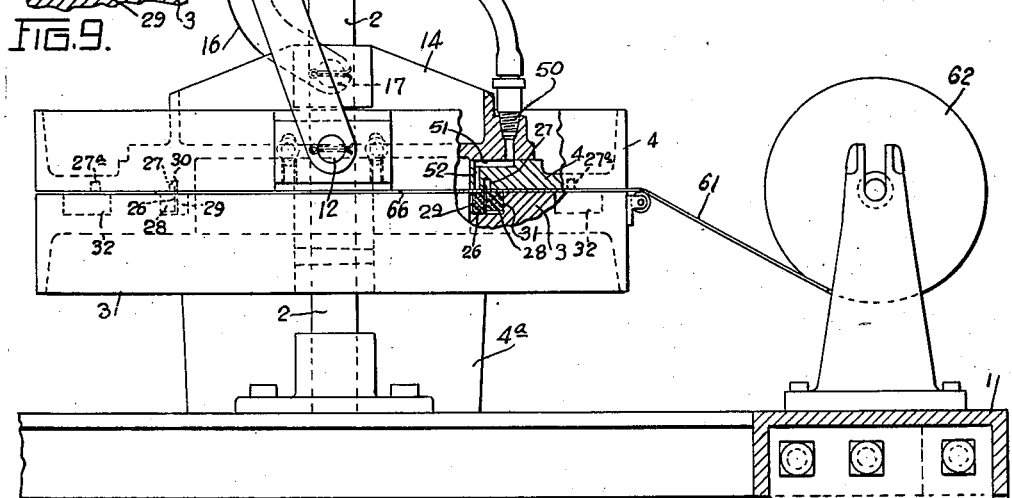
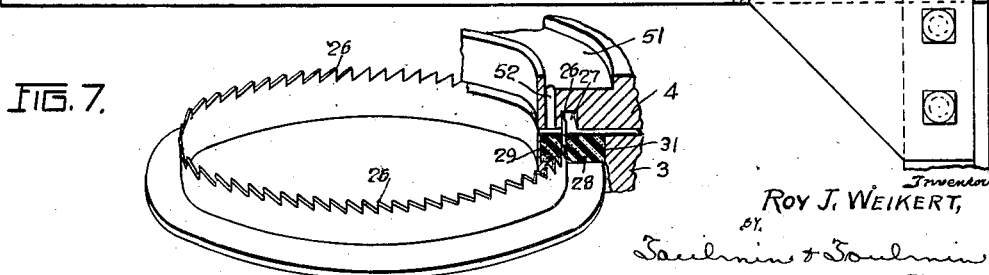
Roy J. Weikert,
Inventor
by Toulmin & Toulmin
Attorneys Sept. 8, 1942. R. J. WEIKERT 2,295,066
PROCESS FOR FORMING RUBBER HYDROCHLORIDE
Filed May 22, 1939 3 Sheets-Sheet 3
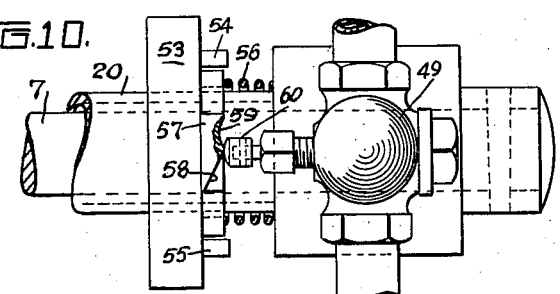
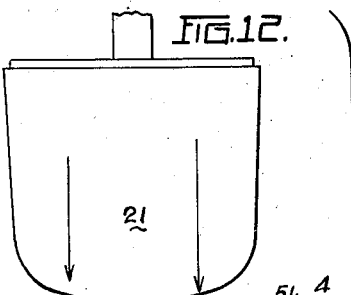
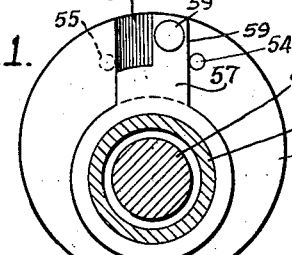
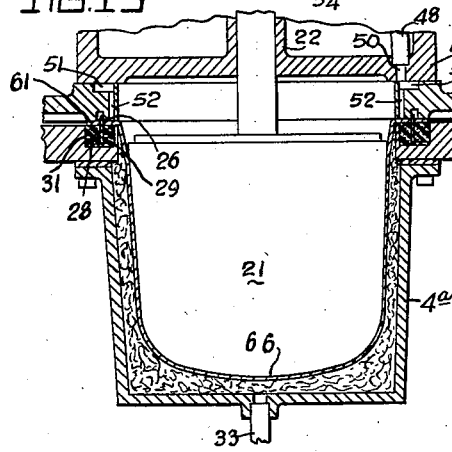
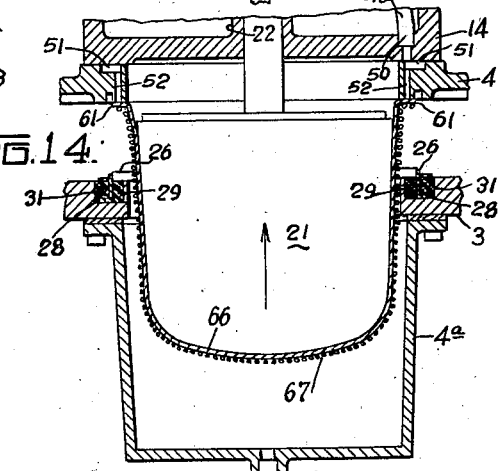
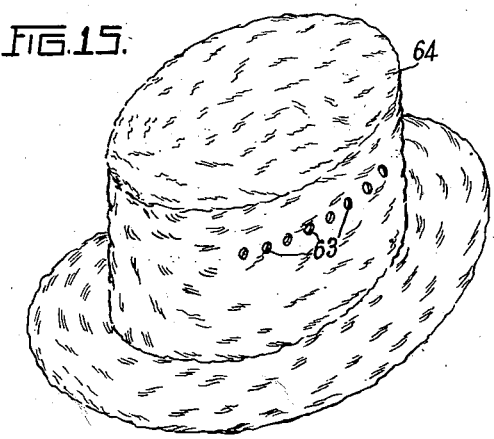
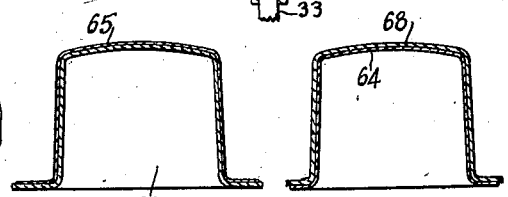
Roy J. Weikert,
Toulmin & Toulmin
Attorneys Patented Sept. 8, 1942

2,295,066

UNITED STATES PATENT OFFICE 2,295,066

PROCESS FOR FORMING RUBBER HYDROCHLORIDE

Roy J. Weikert, Covington, Ohio

Application May 22, 1939, Serial No. 274,867

9 Claims. (Cl. 18—56)

This invention relates to a process for forming or shaping rubber hydrochloride into articles. The method includes conditioning the rubber hydrochloride so that it is rendered stretchable and then stretching it while it is in this conditioned state.

The invention relates more particularly to the formation of a convex area in a sheet of rubber hydrochloride of the type known as "Pliofilm" which is manufactured by The Goodyear Tire & Rubber Company, Akron, Ohio. In a preferred embodiment, the invention is applied to the formation of an upstanding crown in a sheet of "Pliofilm," whereby to provide a protecting cover or liner for a hat. However, it is to be understood that the invention is adaptable to the manufacture of any type of article from "Pliofilm" by stretching the same while it is in a conditioned state. In a still more particular aspect, the invention involves first conditioning the "Pliofilm" by subjecting it to the action of moist heat, as, for example in the form of steam, for a sufficient period of time to render the "Pliofilm" readily stretchable; the "Pliofilm" is stretched after it has been thus conditioned and is then allowed to cool to such an extent that it again assumes its relatively nonstretchable condition whereupon the article is ready for use.

It is the principal object of this invention to devise a process for enabling the production of a stretched article of rubber hydrochloride.

Another object is to provide a method for stretching rubber hydrochloride which comprises conditioning the rubber hydrochloride with moist heat such as steam and then stretching the same while it is in the conditioned state.

Still another object is to provide a process of the foregoing type wherein the stretched sheet of rubber hydrochloride is exposed to the atmosphere to allow the condensed steam thereon to evaporate, thereby chilling the deformed rubber hydrochloride into its nonstretchable condition, whereby it is given a permanent shape.

Yet another object is to devise a process of the foregoing type wherein a sheet of rubber hydrochloride is shaped by stretching a central portion thereof so as to form a hat cover or a hat liner; this forming is accomplished by the insertion of a suitable mold member into the central conditioned portion of the blank, the deformed portion of the blank forming the crown and the annular portion surrounding the same being utilized for clamping the material whereby effective forming is obtained; this annular peripheral portion is substantially unstretched during the process and retains its original state after the process of formation is completed; thus the central portion is stretched into the desired crown form, while the brim portion is left substantially unchanged.

Still other objects will more fully hereinafter appear.

Referring to the accompanying drawings:

Figure 1 is a front elevation, partly in section, of apparatus adapted to prepare either hat covers or hat liners from sheets of rubber hydrochloride.

Figure 2 is a detailed plan view of the steam valve and actuating cam in the position where the steam valve is opened so as to admit steam to the steam chest.

Figure 3 is a sectional view on the line 3—3 of Figure 2.

Figure 4 is a detailed perspective of the pivoted cam follower employed to actuate the steam valve of Figure 2.

Figure 5 is a side elevation of the apparatus shown in Figure 1, with the vacuum applying means and the blank cutting means in section.

Figure 6 is a plan view of the lower clamping plate with a blank disposed over the steam chest, and showing the cutting means for cutting the blank to desired shape.

Figure 7 is a detailed enlarged view showing the cutting means and the means for applying vacuum to the shaped blank so as to retain it in contact with the raised assembly and thereby to allow it to contact the atmosphere.

Figure 8 is a detailed enlarged view of a section of the knife.

Figure 9 is a detailed sectional view showing how the clamping plate renders the knife blade operative.

Figure 10 is a plan view of the vacuum valve and its operating mechanism showing the vacuum valve opened by the cam surface.

Figure 11 is a sectional view on the line 11—11 of Figure 1, showing further details of the vacuum valve operating mechanism.

Figure 12 is a diagrammatic view showing the mold member about to enter the steam chamber and showing the steam being applied to the blank to condition same.

Figure 13 is a diagrammatic view showing the relationship of the steam chest and the mold member when the mold member is at the bottom of its stroke.

Figure 14 is a similar diagrammatic view showing the mold member and clamping plate, with the blank held in place by vacuum, being raised out of the steam chest whereby the blank is exposed to the atmosphere.

Figure 15 is a perspective of a hat liner prepared in accordance with the present invention.

Figures 16 and 17 are sectional views showing a hat cover and a hat liner, respectively, applied to a hat to protect the same.

Referring to the drawings in detail, reference numeral 1 designates a supporting frame on which are rigidly mounted vertical support members 2. Fixedly mounted between and surrounding support members 2 is a lower plate designated generally as 3, which is provided with an oval opening below which is mounted the steam chest 4a. Slidably mounted relative to support members 2 is a clamping plate 4 which is adapted to reciprocate vertically on support members 2. Clamping plate 4 is provided with an opening corresponding to the opening in lower plate 3. Clamping plate 4 is adapted to be raised and lowered by means of handle 5 which is attached to an arm 6 which is fixedly mounted on the end of a transverse rotatable shaft 7. Shaft 7 is journaled in journal members 9 at the top of supports 2. An arm 8 corresponding to arm 6 is provided at the left hand side of Figure 1 and arms 6 and 8 are connected with clamping plate 4 by means of arms 10 which are pivoted at points 11 and 12. Thus, vertical movement of clamping plate 4 is effected by vertically moving handle 5. Arms 10 are provided with a bend at 13 which allows arms 6 and 8 and handle 5 to go slightly past the top dead center position so that the clamping plate 4 will be held at its upward position while a fresh blank is being placed in position over the steam chest.

Disposed above clamping plate 4 is a mold carrying plate 14 which is similarly reciprocatable in a vertical direction on supports 2. This plate 14 is adapted to be moved upwardly or downwardly by means of connecting links 16 which are pivoted to the mold carrying the plate 14 at 17 and which pivotally engage a transverse operating handle 18, which is carried by two arms 19 integral with a sleeve 20 which rotatably surrounds shaft 7 intermediate journals 9.

Links 16 are bowed in a manner similar to arms 10 so that handle 18 is enabled to rotate upwardly to a point slightly past its top dead center position whereby plate 14 is held out of operative position. As a result of the construction thus far described, plate 4 can be lowered into engagement with lower plate 3 without disturbing the position of mold carrying plate 14 and then mold carrying plate 14 can be lowered into the position shown in Figure 1. After the shaping operation is completed, plates 14 and 4 may be raised simultaneously by pushing the handle 5 upwardly into its uppermost position, which is just past dead center.

Mold carrying plate 14 is provided centrally with a sleeve 15 in which is mounted a vertical member 22 held in the desired position by set screw 23 and upon which male mold 21 is fixedly mounted. Thus, by means of set screw 23, the vertical positioning of the mold 21 is adjusted. Mold member 21 is optionally provided with perforating members 24 which are actuated by pushing downwardly on a handle 25 so as to perforate the formed blank.

Means is provided for cutting the blank sheet of rubber hydrochloride to the desired oval shape prior to the conditioning thereof. This means comprises an annular cutting knife 26 which is adapted to be received by an annular slot 27 in clamping plate 4. Knife 26 is surrounded by two concentric rings of sponge rubber 28 and 29, which, when clamping plate 4 is in its inoperative position, expand above the uppermost portion of cutting knife 26, thereby allowing the rubber hydrochloride sheeting to be drawn into position over the lower plate 3 without being cut or scarred by the upper edge of knife 26. Then when clamping plate 4 is lowered, it compresses the sponge rubber rings 28 and 29 and the edge 30 of its recess 27 cooperates with cutting knife 26 to cut the blank sheet to the desired oval form. Knife 26 and rings 28 and 29 are carried in an inwardly disposed groove 31 formed in lower plate 3. The knife and its protective sponge rubber rings are disposed in this groove 31 when it is desired to provide a relatively narrow brim. When it is desired to provide a relatively wide brim, knife 26 and rings 28 and 29 are removed from slot 32 and a similar knife and set of protective sponge rubber rings of larger diameter are placed in an outer groove 32 and in this position, the knife is received by and cooperates with a recess 27a formed in clamping plate 4. Slots 31 and 32 may be of any desired diameter As the cutting of the blank to its oval form takes place by the engagement of clamping plate 4 with lower plate 3, the blank 66 is firmly clamped along its brim portion between plates 3 and 4 and between plate 4 and sponge rubber ring 29, so that it cannot be displaced when mold 21 comes into contact with it in the forming operation. As mold member 21 is started on its downward movement by manipulation of handle 18 downwardly, steam is automatically applied to the blank 66 by passing steam into steam chest 4a through steam pipe 33. When the mold member 21 reaches its lowermost position, this steam supply has been automatically cut off.

Provision is made for preventing the application of steam to steam chest 4a during the raising of plates 4 and 14 and mold member 21 with the formed blank held thereto. Control over the application of steam to the steam chest is effected by a cam member 34 fixedly mounted on rotatable sleeve 20 and therefore rotating with handle 18. This cam member 34 is provided with an elevated cam surface 35 which opens the steam valve 36 as handle 18 is started in its downward movement. Cam surface 35 is provided with an inclined portion 37 upon which cam follower 38 rises as handle 18 is lowered. Cam follower 38 is carried on arms 39 which are pivoted at 40 and are adapted to engage the valve operating member 41. Arms 39 are pivoted with respect to an arm 42 which is pivoted at 43 to the machine. Arm 42 is provided with a slanting surface 44 and with a slanting surface 45.

Thus as cam member 34 is rotated in a clockwise direction (Figure 3), as handle 18 is lowered, cam follower 38 rises on inclined surface 37 and arms 39 are forced into engagement with slanting surface 45 of arm 42 and thus the steam valve operating member 41 is pushed inwardly because arm 42 pivots about point 43. The opening of steam valve 36 is maintained for a sufficient period of time to condition the blank stretched over steam chest 4a and this application of steam is then cut off by the further lowering of mold member 21 by reason of cam follower 38 dropping down the right angle surface 46 on cam 34. As will be understood, a spring in valve 36 normally tends to push member 41 outwardly, thereby normally to maintain the steam cut off.

As the mold member 21 is raised out of the position shown in Figures 1 and 13, cam follower 38 strikes right angle surface 46 and causes arms 39 to pivot rearwardly until they strike slanting surface 44, when cam follower 38 is allowed to pass by cam surface 35 without opening valve 36. A relatively light spring 47 tends to maintain cam follower arms 39 in engagement with slanting surface 45 of arm 42, but yieldingly allows arms 39 to be carried against slanting surface 44. In this way, application of steam to steam chest 4a during the raising of mold member 21 is prevented.

Means is provided for applying vacuum to the space between the plates 14 and 4 so as to hold these plates together while they are being raised and so as to hold the formed blank 66 into engagement with mold member 21 whereby it is exposed to the atmosphere and allowed to chill. This means comprises a vacuum line 48 in which is disposed a vacuum valve 49 and which is connected to mold carrying plate 14 as at 50. Vacuum line 48 communicates with an annular recess 51 formed in the upper surface of clamping plate 4. Recess 51 extends completely around the plate 4 and is in connection with the brim of the blank 66 by means of a plurality of vertical holes 52 extending through plate 4. Thus as plates 4 and 14 are raised so as to raise mold member 21, they are sealed firmly to one another by the vacuum and the blank is held firmly into engagement with mold member 21. In this way, the stretched blank is exposed to the atmosphere and chilled by the evaporation of the moisture therefrom and by contact with the relatively cool atmospheric air.

Means is provided for applying the vacuum before the upstroke of mold member 21 begins and for maintaining the vacuum during substantially the entire upward movement of mold member 21. This means comprises a cam member 53 which is fixedly attached to rotatable sleeve 20. Cam member 53 is provided with two actuating pins 54 and 55. Rotatably surrounding sleeve 20 and pressed into engagement with cam 53 by a suitable spring 56 is a cam surface-carrying member 57 which is provided with an inclined surface 58 and with a recess 59 in its uppermost portion. Vacuum valve 49 is provided with an actuating pin 60 which is normally pressed outwardly by a spring contained in valve 49. As handle 18 is lowered, cam member 53 is rotated in a counter-clockwise direction (Figure 11) and pin 54 moves until, at the extreme bottom position of mold member 21, it has attained the position indicated in full lines in Figure 11, and has caused member 57 to be pushed under pin 60 until pin 60 engages the recess 59 in the uppermost portion of cam surface 57. Pin 55 is then in the inoperative position indicated by the full lines in Figure 11. Thus vacuum is applied at the lowermost position of member 21. As mold member 21 is raised, cam surface member 57 remains stationary, pin 60 remaining in recess 59 so that the application of vacuum is continued during the upward movement of mold member 21. Meanwhile, member 53 is rotated in a clockwise direction (Figure 11), until, as mold member 21 approaches its topmost position, pin 55 assumes the dotted position in Figure 11, whereupon it causes member 57 to be pushed out of engagement with pin 60, thereby closing vacuum valve 49 and cutting off the application of vacuum, thus allowing the blank to be removed from mold member 21 and allowing plates 4 and 14 to be separated from one another so that the cycle can be carried out again. Pin 54 will assume the inoperative dotted position of Figure 11 while this latter action is taking place.

While the operation of the mechanism and the process will be in part obvious from the foregoing description of the apparatus, it is deemed desirable to enlarge upon the details of the mode of operation. A roll of rubber hydrochloride sheeting designated as 62 is provided behind the machine (Figure 5); rubber hydrochloride sheeting 61 is withdrawn from the roll up into position over the steam chest 4a, a suitable length, as indicated in Figure 6, being provided. Handle 5 is then pulled downwardly, carrying with it clamping plate 4. This lowering of clamping plate 4 causes substantially simultaneous cutting of the blank 66 to the oval shape desired and clamping of the brim portion of the blank 66. Handle 18 is then lowered, causing steam to be applied at least instantaneously to steam chest 4a. This steam expands to atmospheric pressure in steam chest 4a and almost instantaneously conditions the blank 66 for the subsequent stretching operation. The mold member 21 then contacts the conditioned blank 66 and stretches it in the manner shown in Figures 1 and 13, an atmosphere of steam remaining about the material being formed. As the lowering of mold member 21 is continued, the application of steam to steam chest 4a is discontinued, at a point just before mold member 21 reaches its lowermost position.

Vacuum is applied to the brim of the blank at the position shown in Figure 13. The handle 5 is then raised, carrying plates 14 and 4 upwardly together, and mold member 21 is thus withdrawn from steam chest 4a with the formed blank adhering thereto, as indicated in Figure 14. Beads of condensed moisture on the blank (indicated as 67 in Figure 14) then evaporate on contacting the cooler outside air and this cool outside air further acts to chill the stretched blank. Upon raising the mold member 21 to substantially its uppermost position (handles 5 and 18 both being just past top dead center), the application of vacuum is discontinued and the blank is now sufficiently chilled to retain its deformed shape and may be removed from mold member 21 and clamping plate 4. If desired, suitable perforations 63 may be made in the blank 64 by striking handle 25 downwardly just before raising handle 5. These perforations 63 provided in the hat liner 64 (see Figure 15) provide ventilation for the hat. When making hat covers 65, these perforations are usually not desirable and will be omitted.

In Figure 16, a hat 68 is shown with a hat cover 65, having a relatively wide brim, applied thereover to protect it. In Figure 17, the hat 68 is lined with a hat liner 64 having a relatively narrow brim. The hat liner or cover may be permanently or temporarily combined with the hat. For example, the hat cover may be used to protect the hat from manufacture until sale, or it may be utilized by the wearer of the hat for protection against rain. Likewise, the hat liner may be worn inside the hat to protect the hat against staining and may be replaced as deemed desirable.

If desired, a suitable check valve may be provided to allow the steam in steam chest 4a to pass out to the atmosphere when mold member 21 is inserted into steam chest 4a.

In order to render the "Pliofilm" stretchable, it is merely necessary that steam, or moisture and heat, be applied thereto for a sufficient length of time. In practice, a momentary application of steam of 40 to 50 pounds pressure to steam chest 4a will be sufficient to practically instantaneously condition the blank for stretching. This steam, as explained above, expands to substantially atmospheric pressure upon its admission to steam chest 4a, and the resulting application of moist heat at a temperature of at least 210° F. results in an almost instantaneous conditioning of the sheet, even though it is applied on only one side thereof. The higher the steam pressure, the shorter may be the period of admission of steam to steam chest 4a. During the application of steam, some of it condenses on the blank and an appreciable amount actually enters the interstices of the blank, resulting in a high concentration of moisture therein, which, coupled with the temperature of at least 210° F., renders the "Pliofilm" readily stretchable, without injury thereto.

Instead of applying the steam as described above, it may be applied intermittently or in any other desired manner to condition the blank.

It is to be understood that I contemplate as coming within my invention the application of moist heat to either one or both sides of the material, although the application thereof to only one side of the material results in completely satisfactory operation. It will be further understood that the inventive thought herein is not limited to the making of hat covers and hat liners but is broadly applicable to the making of any article wherein the "Pliofilm" is stretched to form a concave surface therein. It is pointed out that the stretching action described herein results in a thinning of the blank in the crown portion while the brim portion retains its original thickness. So effective is the process described herein, that this thinning of the material upon stretching takes place without injury or breakage of the blank. Thus, it will be seen that the process described herein is not analogous to the drawing of sheet metal wherein the whole blank becomes progressively thinner, since the clamped portions of the blank utilized herein are not stretched or rendered thinner.

It is to be understood that I desire to comprehend as within my invention, such modifications as may be necessary to adapt it to varying conditions and uses.

Having thus fully described my invention, what I claim as new and desire to secure by Letters Patent, is:

1. A process of shaping rubber hydrochloride material to form a protective covering for hats, comprising clamping the side edges of the sheet of rubber hydrochloride material within a closed receptacle, moving a male mold member against the sheet of rubber hydrochloride material whilst simultaneously subjecting the opposite surface of the said material to a moist heating medium within the area defined by the clamped side edges to partially impregnate the material with moisture and to cause the said material to stretch in the shape of a hat, the said opposite surface of the material being entirely free from contact with any solid member and fully exposed to the action of the said heating medium during the entire stretching action with the exception of the clamped edges of said material, to thereby form the hat crown protective portion by said male mold member, and the brim protecting portion by the clamped side edges of said material.

2. A process of shaping rubber hydrochloride material to form a protective covering for hats, comprising clamping the side edges of the sheet of rubber hydrochloride material within a closed receptacle, moving a male mold member against the sheet of rubber hydrochloride material whilst simultaneously subjecting the opposite surface of the said material to steam within the area defined by the clamped side edges to partially impregnate the material with moisture and to cause the said material to stretch in the shape of a hat, the said opposite surface of the material being entirely free from contact with any solid member and fully exposed to the action of the said steam during the entire stretching action with the exception of the clamped edges of said material, to thereby form the hat crown protective portion by said male mold member and the brim protecting portion by the clamped side edges of said material.

3. A process of shaping rubber hydrochloride material to form a protective covering for hats, comprising clamping the side edges of the sheet of rubber hydrochloride material within a closed receptacle, moving a male mold member against the sheet of rubber hydrochloride material whilst simultaneously subjecting the opposite surface of the said material to steam within the area defined by the clamped side edges to partially impregnate the material with moisture and to cause the said material to stretch in the shape of a hat, the said opposite surface of the material being entirely free from contact with any solid member and fully exposed to the action of the said steam during the entire stretching action with the exception of the clamped edges of said material, expanding the steam to substantially atmospheric pressure while in contact with said material, to thereby form the hat crown protective portion of said male mold member and the brim protecting portion by the clamped side edges of said material.

4. A process of shaping rubber hydrochloride material to form a protective covering for hats, comprising clamping the side edges of the sheet of rubber hydrochloride material within a closed receptacle, moving a male mold member against the sheet of rubber hydrochloride material whilst simultaneously subjecting the opposite surface of the said material to a moist heating medium within the area defined by the clamped side edges to partially impregnate the material with moisture and to cause the said material to stretch in the shape of a hat, the said opposite surface of the material being entirely free from contact with any solid member and fully exposed to the action of the said heating medium during the entire stretching action with the exception of the clamped edges of said material, to thereby form the hat crown protective portion by said male mold member, and the brim protecting portion by the clamped side edges of said material, and opening said receptacle to expose the molded sheet to the surrounding atmosphere, and maintaining said sheet of material in said atmosphere for a period of time to cool the formed sheet material and cause it to set in its molded shape.

5. A process of shaping rubber hydrochloride material to form a protective covering for hats, comprising clamping the side edges of the sheet of rubber hydrochloride material within a closed receptacle, moving a male mold member against the sheet of rubber hydrochloride material whilst simultaneously subjecting the opposite surface of the said material to steam within the area defined by the clamped side edges to partially impregnate the material with moisture and to cause the said material to stretch in the shape of a hat, the said opposite surface of the material being entirely free from contact with any solid member and fully exposed to the action of the said steam during the entire stretching action with the exception of the clamped edges of said material, expanding the steam to substantially atmospheric pressure while in contact with said material, to thereby form the hat crown protective portion of said male mold member and the brim protecting portion by the clamped side edges of said material, and opening said receptacle to expose the molded sheet to the surrounding atmosphere, and maintaining said sheet of material in said atmosphere for a period of time to cool the formed sheet material and cause it to set in its molded shape.

6. A process of shaping rubber hydrochloride material to form a protective covering for hats, comprising clamping the side edges of the sheet of rubber hydrochloride material within a closed receptacle, moving a male mold member against the sheet of rubber hydrochloride material whilst simultaneously subjecting the opposite surface of the said material to a moist heating medium within the area defined by the clamped side edges to partially impregnate the material with moisture and to cause the said material to stretch in the shape of a hat, the said opposite surface of the material being entirely free from contact with any solid member and fully exposed to the action of the said heating medium during the entire stretching action with the exception of the clamped edges of said material, to thereby form the hat crown protective portion by said male mold member, and the brim protecting portion by the clamped side edges of said material, and applying a vacuum to a portion of said material and removing said male mold member and said formed material from said receptacle to expose said opposite surface of the material to atmospheric pressure for a period of time to cool the formed sheet of material and cause it to set in its molded shape.

7. A process of shaping rubber hydrochloride material to form a protective covering for hats, comprising clamping the side edges of the sheet of rubber hydrochloride material within a closed receptacle, moving a male mold member against the sheet of rubber hydrochloride material whilst simultaneously subjecting the opposite surface of the said material to a moist heating medium within the area defined by the clamped side edges to partially impregnate the material with moisture and to cause the said material to stretch in the shape of a hat, the said opposite surface of the material being entirely free from contact with any solid member and fully exposed to the action of the said heating medium during the entire stretching action with the exception of the clamped edges of said material, to thereby form the hat crown protective portion by said male mold member, and the brim protecting portion by the clamped side edges of said material, and applying a vacuum to a portion of said material and removing said male mold member and said formed material from said receptacle to expose said opposite surface of the material to atmospheric pressure for a period of time to cool the formed sheet of material and cause it to set in its molded shape, releasing the vacuum and removing the formed material from the male mold member.

8. A process of shaping rubber hydrochloride material within a closed receptacle, moving a male mold member against the sheet of rubber hydrochloride material whilst simultaneously subjecting the opposite surface of the said material to steam within the area defined by the clamped side edges to partially impregnate the material with moisture and to cause the said material to stretch in the shape of a hat, the said opposite surface of the material being entirely free from contact with any solid member and fully exposed to the action of the said steam during the entire stretching action with the exception of the clamped edges of said material, to thereby form the hat crown protective portion by said male mold member and the brim protecting portion by the clamped side edges of said material, applying a vacuum to the brim portion of said material and removing said material and mold member from said closed receptacle while applying vacuum to said brim portion and exposing said opposite surface of the material to atmospheric pressure to cause the material to set while the material is on said mold and subsequently removing the set material from the mold.

9. A process of shaping rubber hydrochloride material to form a protective covering, comprising clamping the side edges of the sheet of rubber hydrochloride material within a closed receptacle, moving a male mold member against the sheet of rubber hydrochloride material whilst simultaneously subjecting the opposite surface of the said material to a moist heating medium within the area defined by the clamped side edges to partially impregnate the material with moisture and to cause the said material to stretch in the shape of the finished article, the said opposite surface of the material being entirely free from contact with any solid member and fully exposed to the action of the said heating medium during the entire stretching action with the exception of the clamped edges of said material, to thereby form one portion of the article by the said male mold member, and another portion by the clamped side edges of said material.

ROY J. WEIKERT.